F. W. KNUDSEN.
CARCASS SPLITTING MACHINE.
APPLICATION FILED DEC. 24, 1921.
1,434,440.
Patented Nov. 7, 1922.
2 SHEETS—SHEET 1.
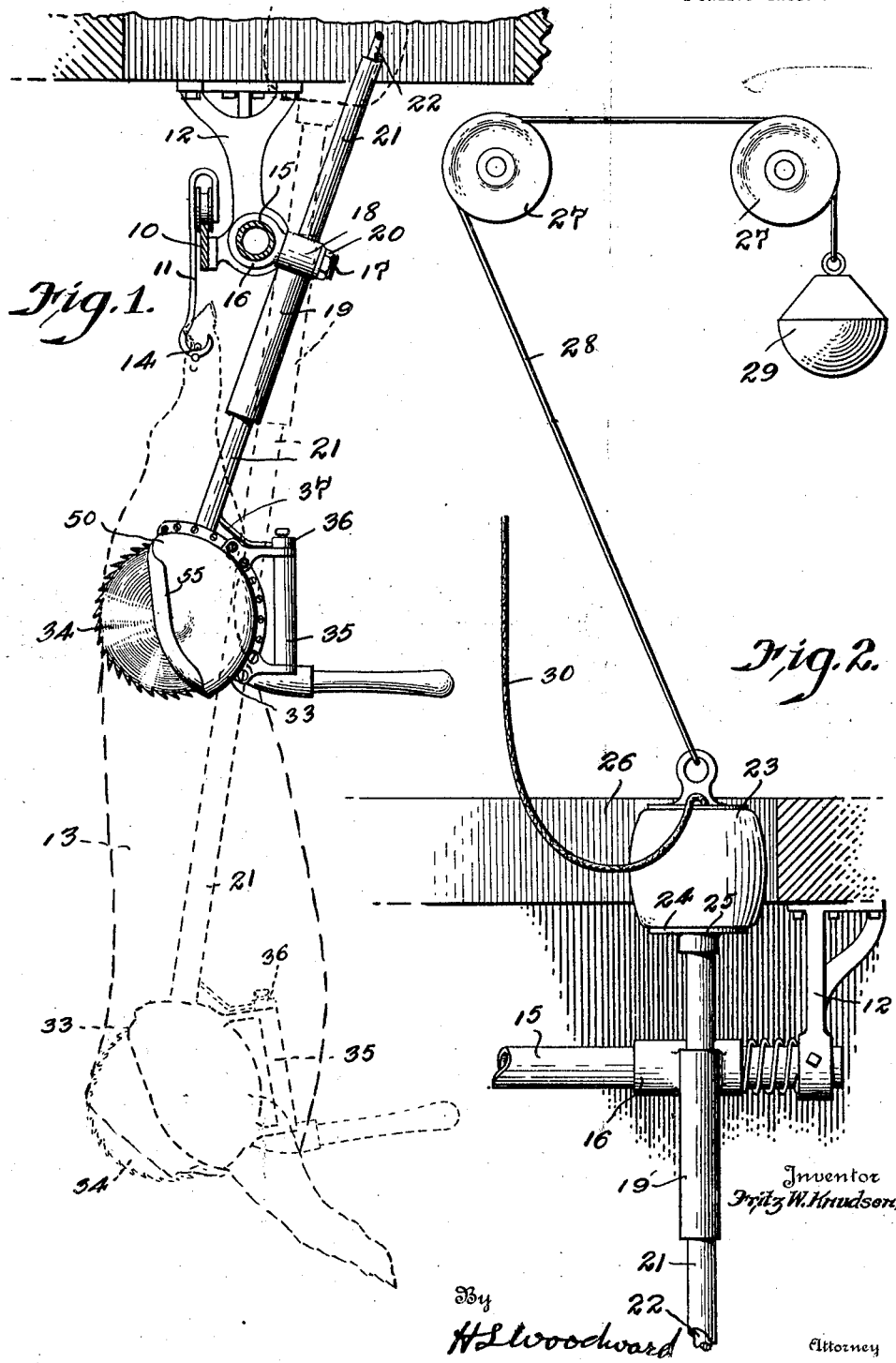

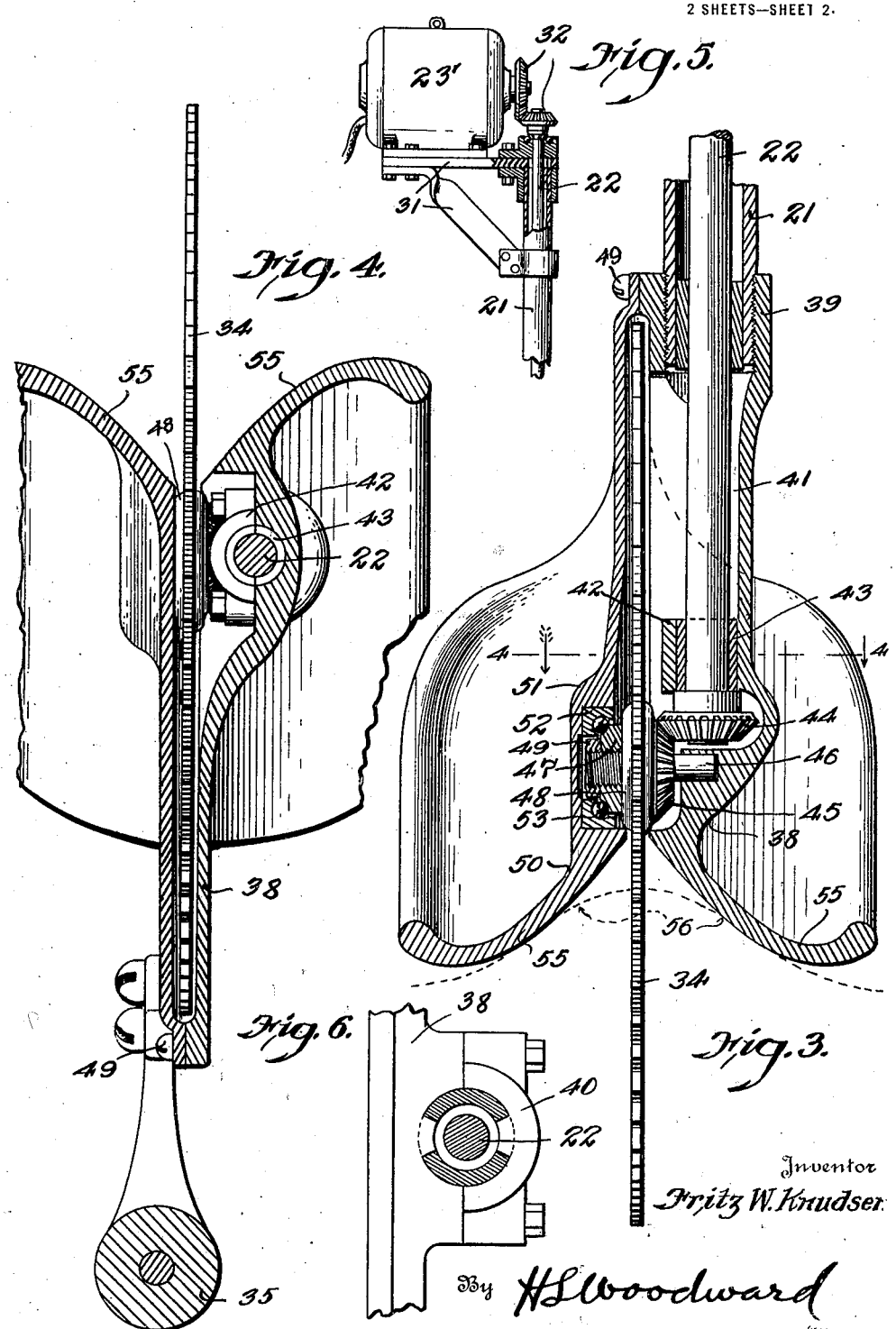

Patented Nov. 7, 1922.

1,434,440

UNITED STATES PATENT OFFICE.

FRITZ W. KNUDSEN, OF WASHINGTON, DISTRICT OF COLUMBIA.

CARCASS-SPLITTING MACHINE.

Application filed December 24, 1921. Serial No. 524,676.

*To all whom it may concern:*

Be it known that I, FRITZ W. KNUDSEN, a citizen of the United States, residing at Washington, in the District of Columbia, have invented certain new and useful Improvements in Carcass-Splitting Machines, of which the following is a specification.

The invention has for an object to provide an improved form of cutter for use in halving hogs—that is to say, cutting in half a dressed hog, and especially adapted to use in cutting the hogs down the middle of the back accurately. It is an especial aim to provide such a device which will tend to automatically adjust itself so as to cut along the center of the spine of the hog, thus dividing the carcass evenly. It is a further aim to provide a device of this kind which may be operated readily by one man to quickly cut a hog in half while hung upon the hook of the usual single rail overhead track, although it may be readily adapted to use also in cutting hogs upon double tracks.

It is a very important aim of the invention to so construct this device that it will automatically center itself after being started by the simple application of force pressing the cutter against the inner side of the dressed hog. A further important aim is to provide a device of this character which may be operated satisfactorily upon hogs while in motion along the overhead track, as is often the case in slaughter houses or refrigerating plants.

It is a further aim to improve the construction and mounting of such appliance, whereby a rotary cutter may be readily employed in such a device and for the ends outlined. Additional objects, advantages and features of invention reside in the construction, arrangement and combination of parts, as will be more readily understood from the following description and from the drawings, in which, Figure 1 is an elevational view of one embodiment of my invention with the motor drive removed, and with a hog indicated in position to be cut, in dotted lines, the final position of my cutting device being also dotted.

Fig. 2 is a view of the upper part and mounting of my device, at right angles to Fig. 1, and representing also a slidable mounting, while the structure shown in Fig. 1 represents a universal pivot.

Fig. 3 is a sectional view transversely of the cutter showing the driving connections thereto.

Fig. 4 is a cross sectional view on the line 4—4 of Fig. 3, in the direction of the arrows.

Fig. 5 is a detail of a modified mounting of the motor drive.

Fig. 6 is a detail of a modified method of securing the tube 21 to the part 38.

There is illustrated an overhead rail 10, upon which meat hooks 11 may travel, the rail being carried by brackets 12 and other brackets, where necessary. A whole hog with the head removed is dotted at 13, hung upon a gambrel 14, resting in the hook 11. A horizontal bar 15 may be mounted between two brackets 12, and upon this bar there is revoluble a sleeve 16, which, in Fig. 1 is formed with a stud 17 at right angles thereto, threaded at its outer part and having revoluble thereon a lateral enlargement 18 of a guide sleeve 19; a nut 20 being utilized to hold the sleeve thus mounted on the stud 17. In Fig. 2, the guide sleeve 19' corresponding to the sleeve 19 is formed integrally or secured rigidly to the sleeve 16. Slidable in the guide sleeve, there is a housing tube or stem 21 within which a drive shaft 22 of the device rotates. The tube 21 may be revoluble in the sleeve, or may be splined therein, but in any case it is slidable freely in the sleeve. At its upper end, a motor 23 is mounted on the tube, in one form, a disk 24 having a suitable hub 25 pressed therein, which is welded or otherwise secured upon the upper end of the tube, and in addition may be bolted to the motor frame 22. The shaft 22 may be coupled to the shaft of the motor in any suitable way, various devices and methods being well known for this use. In case there is a low ceiling or floor over the room in which my device is used, a well 26 may be formed therein to permit movement of the motor 23 upwardly therethrough and for such lateral movement as may be necessary, and above the well pulleys 27 are provided at suitable heights, over which runs a cable 28 connected to the motor casing or to the tube 21, as may be desired, a counterweight 29 being provided at the opposite end of the cable. Current for the motor may be transmitted through a cable 30 which may be hung from a convenient fixture with sufficient slack to permit the desired movement of the motor.

In Fig. 5 the tube 21' has a suitable lateral bracket structure 31 at its upper end upon which a motor 23' is mounted, with its axis of rotation at right angles to the axis of the shaft 22, and power is transmitted by means of bevel gears 32, this permitting the shaft 22 to be driven at a different rate of speed from that of the motor by proper proportioning of the gears 32.

At the lower end of the tube 21 a casing 33 is mounted, having a rotary saw 34 mounted therein driven by the shaft 22 as described, and having a handle 35 by which it is operated, the handle having a switch 36 thereon by which the motor may be controlled, the wire 37 from the switch being extended upwardly within the tube 21, to the motor casing. The casing is made in two sections, mounted on a plane medially of the saw blade 34, and of a form to cover about one-half of the circumference of the saw, and having bearings in each section in which the shaft carrying the saw is journalled. The back section 38 of the casing is formed with a socket portion 39 at the upper part in which the end of the tube 21 may be secured, either by being screwed thereinto, or otherwise, Fig. 3 representing the tube as externally threaded and the socket portion 39 internally threaded, while Fig. 6 shows a method whereby the socket portion may be held with a detachable part 40 bolted to the part 38, whereby the tube may be clamped removably. From the socket portion, a channel 41 extending toward the axis of the saw is formed, the shaft 22 extending through this channel and having its lower end journalled in a bearing 42 shown clearly in Figs. 3 and 4, the bearing including a removable cap and usual babbitting 43. A bevelled gear 44 is secured upon the lower end of the shaft 22, meshed with a like gear 45 having a shaft 46 journalled in a suitable socket bearing in the section 38, the gear being utilized as one of the flange elements by which the saw is clamped, the opposite end portion of the shaft 46 being threaded and having a cone 47 screwed thereon, by which a clamping plate 48 may be pressed against the side of the saw opposite the gear 45. The front section 50 of the casing is secured to the back section 38 by means of screws 49, and has a central enlargement 51 in which there is set a ball-race 52 arranged concentrically with the cone 47, balls 53 being interposed in the usual manner.

At those edges of the casing between which the saw 34 projects, there are formed guide flanges 55, extending divergently at a suitable angle from the saw and being curved outwardly and backwardly slightly at their extremities, these flanges being adapted to engage the ribs or the prominence of the spine within the hog, so as to steady the saw when these flanges are pressed against the inner side of the hog as indicated at 56 in Fig. 3.

In the use of this appliance, as hogs are moved along the rail suspended from the hooks 11, an operator grasps the handle 35 of my device, raising it to its upper limit, and when a hog is positioned closely adjacent the mounting of the sleeve 19, the back or outer side of the hog being presented away from the device, the operator energizes the motor through the switch 36, and moves the device into the position shown in full lines in Fig. 1, the cutting of the hog thus being begun. The saw is pressed inwardly until the flanges 55 engage forcibly on each side of the back bone, whereby the device is centered, and it is gradually pressed downwardly so that cutting of the hog will continue down the medial line of the back bone, until the cutter is moved to the position dotted in Fig. 1, when it is raised and moved to an inoperative position, the motor being stopped, if desired. In case the hogs are being moved constantly past the cutting device, the cutter is preferably moved to the one limit of its movement and engaged with the first hog which approaches while in that position, being moved downwardly and laterally as the hog is moved, and as soon as the cutting operation is completed, the device is raised and moved back to the left or right, as the case may be, to initial position.

The device is readily adapted to use upon cattle and other forms of meat besides whole carcasses, as will be understood.

It is desirable that the saw be operated so that its lower part shall move toward the casing, so that the device will thereby be drawn toward the work, and in that manner held centered, requiring only a downward pressure on the operating handle by the workman after the saw is properly started.

What is claimed:—

1. In a device of the character described, a rotary saw, a mounting therefor movable in a plane with the saw and transversely thereto, divergent meat engaging centering members extending beside the saw, means to operate the saw and means to move the mounting for cutting action.

2. In a device of the character described, a semicircular casing, a saw concentrically revoluble therein, means to move the casing, for operation of the saw, operative connections for the saw, a stem-like member projected upwardly from the casing, a pivoted sleeve receiving the stem-like member slidably, and counterbalancing means engaged with the outer part of the stem.

3. In a device of the character described, a semicircular casing, a saw concentrically revoluble therein, means to move the casing for operation of the saw, a stem-like member projected upwardly from the casing, a pivoted sleeve receiving the stem-like member slidably, and counterbalancing means engaged with the outer part of the stem, a motor mounted on the upper end of the stem, and operative connections between the motor and the saw.

4. In a device of the character described, a saw mounting having a rectilinear mounting stem, a saw revoluble in the mounting, a pivotally mounted sleeve receiving the stem slidably, a counterbalance engaged with the stem, and operative connections for the saw.

5. In a device of the character described, a rotating cutter, a mounting therefor having a stem of considerable length projected therefrom, and a mounting for the stem having a pivotal movement and a bodily movement in a predetermined direction.

6. In a device of the character described, a horizontal bar, a guide sleeve extended in a transverse relation thereto pivotally and slidably mounted thereon, a stem slidable in the sleeve, a revoluble cutter mounted on the lower end of the stem, a counterbalance engaged with the stem, and operative connections for the saw.

7. In a device of the character described, a guide sleeve pivoted on an axis transverse thereto, a hollow stem slidable therein, a shaft revoluble therein, a motor mounted on the upper end of the stem, operative connections between the motor and shaft, a revoluble cutter mounted at the lower end of the stem, operative connections between the cutter and shaft, and a counterbalance connected with the stem.

8. In a carcass splitting machine, a trackway for carcass carriers, a guiding support parallel thereto, a mounting movable longitudinally upon the support in fixed relation to the medial line of the support, a splitting device mounted for movement in all directions in a plane fixed with respect to said mounting but translatable with the mounting, the splitting device being fixed rigidly against movement out of said plane.

In testimony whereof I have affixed my signature.

FRITZ W. KNUDSEN.